(12) United States Patent
Nam et al.

(10) Patent No.: US 10,105,919 B2
(45) Date of Patent: Oct. 23, 2018

(54) METHOD FOR MANUFACTURING THIN POLARIZER, AND THIN POLARIZER MANUFACTURED USING SAME

(71) Applicant: LG CHEM, LTD., Seoul (KR)

(72) Inventors: Sung Hyun Nam, Daejeon (KR); Jonghyun Jung, Daejeon (KR); Kyun Il Rah, Daejeon (KR); Hye Min Yu, Daejeon (KR)

(73) Assignee: LG CHEM, LTD., Seoul (KR)

( * ) Notice: Subject to any disclaimer, the term of this patent is extended or adjusted under 35 U.S.C. 154(b) by 72 days.

(21) Appl. No.: 15/039,291

(22) PCT Filed: Sep. 25, 2015

(86) PCT No.: PCT/KR2015/010212
§ 371 (c)(1),
(2) Date: May 25, 2016

(87) PCT Pub. No.: WO2016/052954
PCT Pub. Date: Apr. 7, 2016

(65) Prior Publication Data
US 2017/0157869 A1 Jun. 8, 2017

(30) Foreign Application Priority Data
Sep. 30, 2014 (KR) .................. 10-2014-0132072

(51) Int. Cl.
*G02B 5/30* (2006.01)
*B29D 11/00* (2006.01)
*B32B 27/36* (2006.01)
*B29C 55/02* (2006.01)
*B29C 55/00* (2006.01)
*B29L 11/00* (2006.01)

(52) U.S. Cl.
CPC ...... *B29D 11/00644* (2013.01); *B29C 55/005* (2013.01); *B29C 55/02* (2013.01); *B29D 11/00894* (2013.01); *B32B 27/36* (2013.01); *G02B 5/3033* (2013.01); *B29K 2629/04* (2013.01); *B29L 2011/0066* (2013.01)

(58) Field of Classification Search
CPC .................................. G02B 5/3033
USPC ...................................... 427/163.1
See application file for complete search history.

(56) References Cited

U.S. PATENT DOCUMENTS

| | | | |
|---|---|---|---|
| 8,699,135 B2 | 4/2014 | Goto et al. | |
| 2004/0212885 A1* | 10/2004 | Mizushima | G02F 1/133528 359/489.15 |
| 2009/0051058 A1 | 2/2009 | Ogomi et al. | |
| 2010/0202051 A1 | 8/2010 | Yoshimi et al. | |
| 2011/0315306 A1* | 12/2011 | Goto | G02B 5/3033 156/229 |
| 2014/0242300 A1* | 8/2014 | Nojiri | C08K 5/3462 428/1.31 |
| 2015/0301252 A1* | 10/2015 | Nam | G02B 5/3033 359/487.02 |

FOREIGN PATENT DOCUMENTS

| | | |
|---|---|---|
| EP | 2682792 A1 | 1/2014 |
| JP | 2003-207619 A | 7/2003 |
| JP | 4975186 B1 | 4/2012 |
| JP | 2013-097113 A | 5/2013 |
| JP | 2013-242341 A | 12/2013 |
| JP | 2013-242342 A | 12/2013 |
| JP | 2014-006505 A | 1/2014 |
| JP | 2014-146035 A | 8/2014 |
| KR | 10-2009-0096301 A | 9/2009 |
| KR | 10-2010-0071998 A | 6/2010 |
| KR | 10-2012-0038123 A | 4/2012 |
| KR | 10-2012-0122799 A | 11/2012 |
| KR | 10-2014-0063451 A | 5/2014 |
| KR | 10-2014-0083268 A | 7/2014 |
| TW | 201430408 A | 11/2014 |
| WO | 2003/040772 A2 | 5/2003 |
| WO | 2012/118185 A1 | 9/2012 |
| WO | 2014/077636 A1 | 5/2014 |
| WO | WO 2014077636 * | 5/2014 |

* cited by examiner

*Primary Examiner* — Elizabeth A Burkhart
(74) *Attorney, Agent, or Firm* — Dentons US LLP

(57) ABSTRACT

The present invention relates to a method for manufacturing a thin polarizer, the method including: a step of preparing an unstretched polyvinyl alcohol-based film having a thickness of 20 μm or less, in which a strength applied to stretch the film by 6 times is 4 N or more; and a single stretching step of forming a stretched polyvinyl alcohol-based film having a thickness of 10 μm or less by stretching the unstretched polyvinyl alcohol-based film solely, and a thin polarizer manufactured by using the same.

10 Claims, No Drawings

METHOD FOR MANUFACTURING THIN POLARIZER, AND THIN POLARIZER MANUFACTURED USING SAME

TECHNICAL FIELD

This application is a National Stage Entry of International Application No. PCT/KR2015/010212, filed on Sep. 25, 2015, and claims the benefit of and priority to Korean Application No. 10-2014-0132072, filed on Sep. 30, 2014, both of which are incorporated herein by reference in their entirety for all purposes as if fully set forth herein.

The present invention relates to a method for manufacturing a thin polarizer, a polyvinyl alcohol-based film used therefor, and a thin polarizer manufactured by using the same.

BACKGROUND ART

Polarizers used in polarizing plates are optical devices for polarizing natural light or arbitrarily polarized light in a particular direction, and are widely used in display devices such as liquid crystal display devices or organic light emitting diode (OLED) devices. Currently, polyvinyl alcohol-based polarizing films, containing an iodine-based compound or a dichroic dye, in which molecular chains are oriented in a predetermined direction, are generally used as the polarizers used in the display devices.

The polyvinyl alcohol-based polarizing film is manufactured by a method of dyeing a polyvinyl alcohol-based film with iodine or a dichroic dye, stretching the polyvinyl alcohol-based film in a predetermined direction, and performing a cross-linking process, and in this case, the stretching process may be performed by a wet stretching process using a solution such as an aqueous boric acid solution or an aqueous iodine solution, or a dry stretching process performed in the atmosphere, and the like, and the stretching magnification is generally 3 times or more.

However, in the manufacturing process in the related art, in order to perform the stretching without causing any break, a polyvinyl alcohol-based film before being stretched is required to have a thickness of more than 60 μm. This is because when the polyvinyl alcohol-based film has a thickness of 60 μm or less before being stretched, the swelling degree of the polyvinyl alcohol-based film is increased, and the breaking strength deteriorates due to the thin thickness, and thus, breaking may be easily generated in the stretching process.

Meanwhile, in accordance with the recent trend for slimness of display devices, polarizing plates are also required to have a thinner thickness. However, when a polyvinyl alcohol-based film having a thickness of 60 μm before being stretched is used as in the related art, there is limitation in decreasing the thickness of a polarizer. Therefore, studies for manufacturing a polarizer having a thinner thickness have been attempted.

Korean Patent Application Laid-Open No. 2010-0071998 discloses a method for manufacturing a thin polarizing plate by using a laminate manufactured by coating a hydrophilic polymer layer onto a base material layer or co-extruding a base material layer forming material and a hydrophilic polymer layer forming material. However, in the case of the coating or the co-extrusion method, the polyvinyl alcohol layer and the base material layer are not easily separated after being stretched, and high peel-off strength is required to separate the polyvinyl alcohol layer and the base material layer, so that in the separation process, there occurs a problem in that a polyvinyl alcohol layer is damaged or deformed, and the like, and as a result, there is a problem in that optical properties such as the polarization degree of the polyvinyl alcohol film deteriorate.

Further, when the coating method or the co-extrusion method is used, a polarizing plate is manufactured by a system of melting a polyvinyl alcohol resin, and then extruding the resin, or preparing the resin into a coating solution, and then performing the application of the coating solution, so that physical properties of a polyvinyl alcohol film manufactured are easily changed according to the extrusion conditions, the coating conditions, or the film-forming conditions, and thus physical properties of a polyvinyl alcohol finally prepared deteriorate, and it is also difficult to implement uniform physical properties.

PATENT DOCUMENT

Korean Patent Application Laid-Open No. 2010-0071998

DISCLOSURE

Technical Problem

The present invention is to solve the aforementioned problems and intended to provide a method for manufacturing a polarizer having a thin thickness while having excellent optical characteristics with excellent productivity.

Technical Solution

In an aspect, the present invention provides a method for manufacturing a thin polarizer, the method including: a step of preparing an unstretched polyvinyl alcohol-based film having a thickness of 20 μm or less, in which a strength applied to stretch the film by 6 times is 4 N or more; and a single stretching step of forming a stretched polyvinyl alcohol-based film having a thickness of 10 μm or less by stretching the unstretched polyvinyl alcohol-based film solely.

In another aspect, the present invention provides a thin polarizer manufactured by the method for manufacturing a thin polarizer and having a thickness of 10 μm or less, a single transmittance of 40% to 45%, and a polarization degree of 99% or more.

Advantageous Effects

According to the manufacturing method of the present invention, it is possible to manufacture a thin polyvinyl alcohol-based thin polarizer having a single transmittance of 40% to 45% and a polarization degree of 99.0% or more, which has very excellent optical properties, and a thickness of 10 μm or less, which is very thin.

Further, in case of the present invention, a thin polarizer is manufactured by stretching an unstretched polyvinyl alcohol film solely, so that when compared to the case of using a base film, it is not necessary to perform a process of separating a base material film and a polyvinyl alcohol film after being stretched, thereby leading to excellent productivity, and it is possible to rule out the possibility that a polyvinyl alcohol-based film is damaged in the separation process, and thus optical properties deteriorate, thereby leading to significant improvement in process stability.

BEST MODE

As a result of repeatedly conducting long-term studies to manufacture a thin polyvinyl alcohol-based polarizing film, the present inventors have found that when a laminated film, which is formed by attaching an unstretched polyvinyl alcohol-based film having a thin thickness onto one surface or both surfaces of an unstretched polymer film, is used, it is possible to manufacture a polarizer having a thickness of 10 μm or less, which is very thin, and excellent optical properties such as a polarization degree without causing any break during the manufacturing process, thereby filing the applications for the inventions on 10-2012-0130576 (Title of the Invention: METHOD FOR MANUFACTURING THIN POLARIZER, AND THIN POLARIZER AND POLARIZING PLATE MANUFACTURED THEREBY) and 10-2012-0130577 (Title of the Invention: METHOD FOR MANUFACTURING THIN POLARIZER, AND THIN POLARIZER AND POLARIZING PLATE MANUFACTURED THEREBY).

However, the application inventions use a laminated film formed by attaching an unstretched polyvinyl alcohol-based film having a thin thickness onto one surface or both surfaces of an unstretched polymer film, and thus an unstretched polymer film having excellent physical properties needs to be separately developed, such that mechanical and/or thermal characteristics do not directly affect the polyvinyl alcohol-based film. Furthermore, in order to prevent a problem in that a polyvinyl alcohol layer is damaged or deformed, additional studies are required because a laminated film formation technology of stretching the laminated film, and then easily separating a polymer film and a polyvinyl alcohol film is required.

Thus, as a result of repeatedly conducting studies to develop a method for manufacturing a thin polarizer by stretching a polyvinyl alcohol-based film solely without using the aforementioned polymer film, the inventors of the present invention have found that when an unstretched polyvinyl alcohol film satisfying a particular condition is used, it is possible to manufacture a thin polarizer having excellent optical characteristics without causing any break in the film even though the unstretched polyvinyl alcohol film is stretched solely, thereby completing the present invention.

Hereinafter, preferred exemplary embodiments of the present invention will be described. However, the exemplary embodiments of the present invention may be modified into various other forms, and the scope of the present invention is not limited to the exemplary embodiments which will be described below. Further, the exemplary embodiments of the present invention are provided to more fully explain the present invention to a person with ordinary skill in the art.

The method for manufacturing a thin polarizer according to the present invention is characterized by including a step of preparing an unstretched polyvinyl alcohol-based film having a thickness of 20 μm or less, in which a strength applied to stretch the film by 6 times is 4 N or more; and a single stretching step of forming a stretched polyvinyl alcohol-based film having a thickness of 10 μm or less by stretching the unstretched polyvinyl alcohol-based film solely.

That is, the method for manufacturing a thin polarizer according to the present invention is characterized in that it is possible to obtain a thin polarizer having excellent optical properties without causing any break even though the unstretched polyvinyl alcohol-based film having a thickness of 20 μm or less is stretched solely, by using an unstretched polyvinyl alcohol-based film having a thickness of 20 μm or less, in which a strength applied to stretch the film by 6 times is 4 N or more.

First, when the unstretched polyvinyl alcohol-based film has a thickness of 20 μm or less, a strength applied to stretch the film by 6 times may be 4 N or more, and more specifically, 4 N to 20 N or 4.5 N to 15 N. Further, when the unstretched polyvinyl alcohol-based film has a thickness of 20 μm or less, a strength applied to stretch the film by 6 times may be 4.5 N to 10 N. Specifically, when the unstretched polyvinyl alcohol-based film is stretched by 6 times, break may not be caused even though the strength in the range is applied. When the strength applied to stretch the film by 6 times is less than 4 N, it is highly likely that break may be caused in the process of stretching an unstretched polyvinyl alcohol-based film solely, and as a result, the productivity significantly deteriorates, so that it is difficult to manufacture a thin polarizer through a single stretching process. In this case, the strength applied to stretch the unstretched polyvinyl alcohol-based film by 6 times may mean force applied to the cross-section in a direction vertical to the stretching direction when the film is pulled at a high magnification of 6 times. Specifically, the strength applied to stretch the film by 6 times may have the same meaning as the force which is close to the time when break may be caused in the film, but may be withstood without causing break, that is, the breaking strength. Specifically, when the unstretched polyvinyl alcohol-based film has a thickness of 20 μm or less, the breaking strength when the film is stretched by 6 times may be 4 N or more.

In the present invention, the strength applied to stretch the unstretched polyvinyl alcohol-based film by 6 times may mean a value measured by stretching the film in an aqueous boric acid solution in a range of 1% to 5% in a temperature range of 50° C. to 60° C. Specifically, the strength applied to stretch the unstretched polyvinyl alcohol-based film by 6 times may mean a value measured by a method for stretching the film in a 1% aqueous boric acid solution at a temperature of 56° C.

Meanwhile, in the method for manufacturing a thin polarizer according to the present invention, the strength applied when the unstretched polyvinyl alcohol-based film is stretched at a stretching magnification of 6 times as described above is used as a reference because more precise data may be obtained in the case where a comparison is made by using the strength applied to the film as a reference when the film is stretched by 6 times, which is a stretching ratio at which break is highly likely to be caused, than in the case where a general breaking strength and the like are used as a reference. As a result of studies by the inventors of the present invention, this is because it was found that the stretching magnification when break is caused may vary even in the case of polyvinyl alcohol-based films made of the same raw material according to the working environment, the environment conditions such as a temperature and humidity during a test, or the storage state of a sample and the like. That is, it is because when the breaking strength and the like are used as a reference, the stretching ratio at the time when break is caused may vary due to the aforementioned variable factors, and an incorrect result may be brought about when strengths having different stretching ratios are used as a reference.

Meanwhile, the unstretched polyvinyl alcohol-based film may have an elastic modulus of less than 2 MPa, preferably 0.01 MPa to 1.8 MPa, and more preferably 0.1 MPa to 1.5 MPa. When the elastic modulus of the unstretched polyvinyl alcohol-based film satisfies the numerical range, the initial stretching characteristics of the unstretched polyvinyl alcohol-based film may be enhanced to expect a stable orientation of the iodine ion species, and a stretching may be achieved at a relatively long interval, thereby improving the orientation of the iodine ion species. Further, since it is possible to secure excellent durability, thermal impact characteristics, and mechanical strength of an unstretched polyvinyl alcohol-based film, it is possible to significantly reduce the probability that the film may be damaged in the stretching process to be described below and the like, and since a sufficiently high magnification stretching may be achieved even when the film is stretched solely, there is an advantage in that a thin polarizer having a thickness of 10 μm or less may be easily manufactured even through a single stretching without forming a laminate by attaching a base material film and the like thereto. In the present specification, the elastic modulus is a measure which represents elastic characteristics of the unstretched polyvinyl alcohol-based film, and means the force which may be withstood without the unstretched polyvinyl alcohol-based film being broken or deformed when physical and/or mechanical stress are applied to the film. Furthermore, in the present specification, the elastic modulus may be measured by a method well-known in the art, and may be a value obtained by measuring a change in frequency response according to the stress applied by using, for example, a dynamic mechanical analyzer (DMA) device manufactured by TA Instrument Inc.

Next, it is preferred that the unstretched polyvinyl alcohol-based film has a thickness of 20 μm or less, preferably 5 μm to 20 μm. When the thickness of the unstretched polyvinyl alcohol-based film is more than 20 μm, it is difficult to implement a thickness of 10 μm or less by stretching the film solely, and when the thickness thereof is less than 5 μm, break is easily caused during the stretching.

Meanwhile, the unstretched polyvinyl alcohol-based film having the aforementioned characteristics according to the present invention may be a film dyed with iodine and/or a dichroic dye. In particular, in the present invention, the unstretched polyvinyl alcohol-based film may be a film subjected to a swelling process and a dyeing process.

Further, the method for manufacturing a thin polarizer according to the present invention may further include a step (dyeing process) of dyeing the unstretched polyvinyl alcohol-based film with at least one of iodine and a dichroic dye before the single stretching step.

In this case, the unstretched polyvinyl alcohol-based film may have a polymerization degree of 2,500 to 3,500. Preferably, the unstretched polyvinyl alcohol-based film may have a polymerization degree of 2,800 to 3,200. In the unstretched polyvinyl alcohol-based film according to the present invention, a film with a high polymerization degree is used, and when the polymerization degree satisfies the range, molecules freely move, the film may be flexibly mixed with iodine or a dichroic dye, and the like, and the single stretching may be easily performed.

Next, the swelling process serves to facilitate the adsorption and diffusion of iodine and/or a dichroic dye on a polyvinyl alcohol-based film and improve the stretchability of the polyvinyl alcohol-based film, and may be performed, for example, by a method of immersing an unstretched polyvinyl alcohol-based film in pure water at 25° C. to 30° C. for 5 seconds to 30 seconds, more preferably 10 seconds to 20 seconds, but the method is not limited thereto. Further, the swelling is preferably performed such that a swelling degree of the unstretched polyvinyl-based film is 36% to 44%, preferably 38% to 42%. When the swelling degree of the unstretched polyvinyl alcohol-based film satisfies the numerical range, optical characteristics of a thin polarizer finally manufactured, such as polarization degree, are excellent. Meanwhile, the swelling degree is calculated based on {(the weight of the polyvinyl alcohol-based film after being swollen–the weight of the polyvinyl alcohol-based film before being swollen)/the weight of the polyvinyl alcohol-based film before being swollen}×100.

Next, the dyeing process serves to dye the polyvinyl alcohol-based film with iodine and/or a dichroic dye, and may be performed, for example, by a method of impregnating an unstretched polyvinyl alcohol-based film in a dyeing bath including a dyeing solution containing iodine and/or a dichroic dye, or applying a dyeing solution containing iodine and/or a dichroic dye onto a polyvinyl alcohol-based film, and in this case, as a solvent of the dyeing solution, water is generally used, but an organic solvent having compatibility with water may be mixed with water.

Here, the iodine molecules and/or the dye molecules may allow a polarized light having a predetermined oscillation direction to be obtained by absorbing light oscillating in a stretching direction of a polarizing plate, and allowing light oscillating in a vertical direction thereof to pass.

In addition, in the dyeing process, the content of iodine and/or a dichroic dye in a dyeing solution may be approximately 0.06 part by weight to 0.25 part by weight based on 100 parts by weight of a solvent. This is because when the content of a dichroic material such as iodine satisfies the numerical range, a polarizer having excellent transmittance may be obtained.

Meanwhile, when iodine is used as a dichroic material, it is preferred that an auxiliary agent such as an iodide is additionally contained in order to improve the dyeing efficiency by increasing the solubility of iodine having low solubility to water. In this case, for the content of the auxiliary agent, the auxiliary agent may be used at a ratio of 0.3 part by weight to 3 parts by weight based on 100 parts by weight of a solvent. Furthermore, the weight ratio of the iodine to the iodide is preferably 1:5 to 1:10. In this case, specific examples of the auxiliary agent include iodide compounds such as potassium iodide, lithium iodide, sodium iodide, zinc iodide, aluminum iodide, lead iodide, copper iodide, barium iodide, calcium iodide, tin iodide, and titanium iodide, or mixtures thereof, but are not limited thereto.

Meanwhile, it is preferred that the temperature of the processing bath is maintained at 25° C. to 40° C. This is because when the temperature of the processing bath is less than 25° C., the dyeing efficiency may deteriorate due to a low temperature, and when the temperature is more than 40° C., a large amount of iodine is sublimed due to a high temperature, and thus the amount of iodine used may be increased. In this case, it is preferred that an unstretched polyvinyl alcohol-based film is immersed in a processing bath for 30 seconds to 120 seconds. This is because when the time for immersion is less than 30 seconds, the unstretched polyvinyl alcohol-based film may not be sufficiently dyed or may not be uniformly dyed, and when the time is more than 120 seconds, the dyeing is saturated, and thus it is not necessary to immerse the film any more, or unnecessary swelling is caused.

In the manufacturing of the present invention, the step of stretching the unstretched polyvinyl alcohol-based film solely as described above may be performed by a wet stretching method or a dry stretching method, and is not particularly limited thereto. However, when a wet stretching is performed, the wet stretching is more preferred in view of an advantage in that the stretching may be performed at a lower temperature than in the dry stretching. In this case, it is preferred that the boric acid concentration of the aqueous boric acid solution is 1.0 wt % to 5.0 wt %.

When the stretching is performed in an aqueous boric acid solution as described above, the break generation ratio of the polyvinyl alcohol-based film is decreased due to the crosslinking of boric acid, and thus the process stability is improved, and it is possible to control the generation of wrinkles of the polyvinyl alcohol-based film, which are easily generated during the wet process.

In this case, it is preferred that the wet stretching is performed in an aqueous boric acid solution because the break generation ratio of the polyvinyl alcohol-based film may be decreased due to the crosslinking of boric acid, the process stability is also improved thereby, and it is possible to control the generation of wrinkles of the polyvinyl alcohol-based film, which are easily generated during the wet process. Further, when the stretching is performed in the aqueous boric acid solution as described above, there is an advantage in that it is possible to perform stretching even at a low temperature compared to the dry stretching. Here, it is preferred that the boric acid concentration in the aqueous boric acid solution is 1 wt % to 5 wt %, or 1.5 wt % to 4.5 wt %.

In this case, a maximum stretching magnification of the unstretched polyvinyl alcohol-based film may be 3 times or more, and preferably 3 times to 15 times. In the present specification, the maximum stretching magnification means a stretching magnification immediately before break is caused in a polyvinyl alcohol-based film. When the maximum stretching magnification satisfies the numerical range, it is very advantageous to manufacture a thin polarizer because stretching may be performed at high magnification.

In the present invention, the stretching conditions in the single stretching step are not particularly limited, but the single stretching step may be performed, for example, at a stretching magnification of 3 times to 15 times at a temperature of 20° C. to 85° C., and more preferably at a stretching magnification of 3 times to 12 times at a temperature of 40° C. to 80° C. Further, the single stretching step may be performed at a stretching magnification of 5 times to 10 times or 6 times to 10 times at a temperature of 20° C. to 85° C.

If necessary, the present invention may further include stretching the unstretched polyvinyl alcohol-based film solely as described above, and then drying the stretched polyvinyl alcohol-based film. In this case, it is preferred that the drying is performed in a temperature range of 20° C. to 100° C. or 40° C. to 90° C. for 1 minute to 10 minutes. The drying process serves to prevent the deterioration in physical properties of a polyvinyl alcohol-based polarizer due to moisture during the process of manufacturing a polarizing plate by removing moisture from the surface and inside of the polyvinyl alcohol-based film, and to improve the polarization degree of the polarizer by smoothly inducing the width shrinkage of the polyvinyl alcohol-based film stretched during the drying to increase the orientation of a complex composed of polyvinyl alcohol and iodine.

Since the method for manufacturing a thin polarizer according to the present invention is characterized by stretching an unstretched polyvinyl alcohol-based film solely as described above, a process of forming a laminated film or a process of separating a polymer film and a polyvinyl alcohol film is not separately required when compared to the case where a thin polarizer is manufactured by stretching the unstretched polyvinyl alcohol-based film in the form of a laminated film, and then separating a polymer film and a polyvinyl alcohol film, and thus, there is an advantage in that it is possible to improve the simplification of the production process and the process stability, and it is also very easy to secure optical properties of the thin polarizer manufactured.

Meanwhile, a thin polarizer, which is manufactured by the method for manufacturing a thin polarizer according to the present invention by using the unstretched polyvinyl alcohol-based film manufactured by the method as described above, has a thickness of 10 µm or less, preferably 1 µm to 10 µm, and more preferably 1 µm to 7 µm, which is very thin. In addition, even at the thin thickness as described above, the single transmittance is about 40% to 45%, and the polarization degree is 99% or more, and thus, excellent optical properties are exhibited.

Next, a polarizing plate may be formed by laminating a transparent film on one surface or both surfaces of the thin polarizer of the present invention as described above. In this case, as the transparent film, various films used as a polarizer protective film or a phase film in the art may be used without limitation, and it is possible to use, for example, an acrylic film, a PET film, a PET film subjected to acrylic primer treatment, a cellulose-based film, a cyclo olefin-based film, a polycarbonate-based film, a polynorbornene-based film, and the like.

The method of laminating the polarizer and the transparent film is not particularly limited, and may be performed by using an adhesive or a tackifier, and the like well-known in the art. In this case, the adhesive or the tackifier may be appropriately selected in consideration of a material for a transparent film used, and the like, and for example, when TAC is used as the transparent film, a water-based adhesive such as a polyvinyl alcohol-based adhesive may be used, and when an acrylic film or a COP film and the like are used as the transparent film, it is possible to use a photocurable or thermosetting adhesive such as an acrylic adhesive and an epoxy-based adhesive.

Meanwhile, the polarizing plate of the present invention may additionally include other functional optical layers, such as a brightness enhancement film, a primer layer, a hard coating layer, an antiglare layer, an anti-reflection layer or a tackifier layer for the attachment onto a liquid crystal panel, in addition to the transparent film. The method of forming these optical layers is not particularly limited, and a publicly known method well-known in the art may be used.

The polarizing plate of the present invention has excellent optical characteristics while having a very thin thickness compared to the polarizing plate in the related art, and may be usefully used for a display device such as a liquid crystal display panel and an organic electroluminescent device.

MODE FOR INVENTION

Hereinafter, the present invention will be described in more detail with reference to the specific Examples.

Example 1

An unstretched polyvinyl alcohol-based film (manufactured by Nippon Synthesis Co., Ltd., M-series), in which the strength applied to the film was 4.8 N, the elastic modulus was 1.5 MPa, and the thickness was 20 µm when the film was stretched by 6 times, was prepared.

Next, the unstretched polyvinyl alcohol-based film was subjected to cleaning process in a 1.0 wt % boric acid solution for 15 seconds, and then stretched solely in a 2.0 wt % boric acid solution at a stretching magnification of 6 times. And then, the polyvinyl alcohol-based film was subjected to complementary color process in a 5.0 wt % potassium iodide (KI) solution, and then dried in an oven at 80° C., thereby obtaining a thin polarizer having a thickness of 8 µm.

Comparative Example 1

A thin polarizer was intended to be manufactured in the same manner as in Example 1 by using an unstretched polyvinyl alcohol-based film, in which the strength applied to the film was 3.3 N and the elastic modulus was 2.8 MPa when the film was stretched by 6 times, but it was difficult to manufacture a thin polarizer because break was caused when the film was stretched.

Comparative Example 2

A thin polarizer having a thickness of 8.3 μm was manufactured in the same manner as in Example 1, except that an unstretched polyvinyl alcohol-based film, in which the strength applied to the film was 4.8 N and the elastic modulus was 2.8 MPa when the film was stretched by 6 times, was used.

Experimental Example 1—Measurement of Optical Characteristics

The optical characteristics of the thin polarizers manufactured in Example 1 and Comparative Example 2 were measured by JASCO V-7100 spectrophotometer, and are shown in the following [Table 1].

TABLE 1

| Classification | Single transmittance (%) | Polarization degree (%) | Single color a | Single color b | Orthogonal color a | Orthogonal color b |
|---|---|---|---|---|---|---|
| Example 1 | 41.88 | 99.9827 | −0.40 | 2.01 | 1.11 | −1.79 |
| Comparative Example 2 | 41.62 | 99.9642 | −0.03 | 1.56 | 1.98 | −2.61 |

Through the [Table 1], it can be seen that the thin polarizer of Example 1, which is manufactured according to the method of the present invention, was excellent in all the optical properties such as single transmittance, a polarization degree, and a color. In contrast, it can be seen that in the case of Comparative Example 1, it was difficult to manufacture a thin polarizer itself, and all the optical properties such as single transmittance, a polarization degree, and a color sense significantly deteriorate in the polarizer manufactured in Comparative Example 2.

Even though the exemplary embodiments of the present invention have been described in detail, the right scope of the present invention is not limited thereto, and it will be obvious to a person with ordinary skill in the art that various modifications and alterations are possible without departing from the technical spirit of the present invention described in the claims.

The invention claimed is:

1. A method for manufacturing a thin polarizer, the method comprising:
a step of preparing an unstretched polyvinyl alcohol-based film having an elastic modulus of 0.1 MPa to 1.5 MPa and a thickness of 20 μm or less, in which a strength applied to stretch the film by 6 times is 4 N or more; and
a single stretching step of forming a stretched polyvinyl alcohol-based film having a thickness of 10 μm or less by stretching the unstretched polyvinyl alcohol-based film without forming a laminate by attaching a base material film and the like thereto,
wherein the method further comprises a step of dyeing the unstretched polyvinyl alcohol-based film with at least one of iodine and a dichroic dye; and a swelling process before the single stretching step,
wherein the unstretched polyvinyl alcohol-based film has a polymerization degree of 2800 to 3,200, and
wherein the swelling process serves by a method of immersing an unstretched polyvinyl alcohol-based film in pure water at 25° C. to 30° C. for 5 seconds to 30 seconds.

2. The method of claim 1, wherein a strength applied to stretch the unstretched polyvinyl alcohol-based film by 6 times is a value measured by a method of stretching the film in an aqueous boric acid solution in a range of 1% to 5% in a temperature range of 50° C. to 60° C.

3. The method of claim 1, wherein the single stretching step is performed by a wet stretching method or a dry stretching method.

4. The method of claim 1, wherein the single stretching step is performed at a stretching magnification of 3 times to 15 times at a temperature of 20° C. to 85° C.

5. The method of claim 1, wherein the single stretching step is performed in an aqueous boric acid solution having a boric acid concentration of 1 wt % to 5 wt %.

6. A thin polarizer manufactured by the method of claim 1,
wherein a thickness is 10 μm or less, a single transmittance is 40% to 45%, and a polarization degree is 99% or more.

7. A thin polarizer manufactured by the method of claim 2,
wherein a thickness is 10 μm or less, a single transmittance is 40% to 45%, and a polarization degree is 99% or more.

8. A thin polarizer manufactured by the method of claim 3,
wherein a thickness is 10 μm or less, a single transmittance is 40% to 45%, and a polarization degree is 99% or more.

9. A thin polarizer manufactured by the method of claim 4,
wherein a thickness is 10 μm or less, a single transmittance is 40% to 45%, and a polarization degree is 99% or more.

10. A thin polarizer manufactured by the method of claim 5,
wherein a thickness is 10 μm or less, a single transmittance is 40% to 45%, and a polarization degree is 99% or more.

* * * * *